United States Patent [19]

Rilling

[11] Patent Number: 4,924,799
[45] Date of Patent: May 15, 1990

[54] INVERSION INDICATOR

[75] Inventor: John F. Rilling, Roswell, Ga.

[73] Assignee: Universal Protection Corp., Roswell, Ga.

[21] Appl. No.: 248,922

[22] Filed: Sep. 26, 1988

[51] Int. Cl.$^5$ .................. G08B 5/00; G01D 21/00
[52] U.S. Cl. ...................... 116/206; 116/215
[58] Field of Search ............ 116/203, 206, 211, 215

[56] References Cited

U.S. PATENT DOCUMENTS

| 1,356,303 | 10/1920 | Monahan | 116/215 |
| 3,437,070 | 4/1969 | Campbell | 116/207 |
| 3,880,108 | 4/1975 | Anton | 116/215 |
| 3,923,000 | 12/1975 | Cloyd | 116/215 |
| 4,340,008 | 7/1982 | Mendelson | 116/215 |

Primary Examiner—William A. Cuchlinski, Jr.
Assistant Examiner—W. Morris Worth
Attorney, Agent, or Firm—Jones, Askew & Lunsford

[57] ABSTRACT

An indicator for detecting whether the indicator has been inverted or tilted beyond a critical angle. The indicator includes a pair of reactants contained within two discrete reservoirs which are separated by a fluid passageway. When the indicator is tilted beyond the critical angle the reactants are contacted producing a reaction product having a color change. The indicator also provides a splash protector to prevent false positive reactions when the unit is agitated but has not been tilted. A first reactant is contained within a frangible ampule that can be broken when the indicator is activated for use. The color change is visible from the outside of the container.

16 Claims, 4 Drawing Sheets

Fig_3

Fig_4

INVERSION INDICATOR

TECHNICAL FIELD

The present invention relates to an indicator for determining whether a workpiece to which the indicator is attached has been tilted or inverted. More particularly, the present invention relates to a device containing a pair of reactants which are normally separated but which are permitted to interact upon inversion of the device to produce a detectable reaction.

BACKGROUND OF THE INVENTION

There are many categories of goods which can be damaged or stressed by improper transport procedures. Oftentimes such damage or stress is not immediately visible by inspection of the goods. One example of such goods is wine, which, if stored with the cork above the level of liquid for an extended period of time, could result in oxidation of the wine, thus affecting its quality.

Other types of goods not receptive of indelicate handling include sensitive instruments and equipment such as refrigerators or washing machines, which may have certain components stressed if tilted or inverted during shipping.

A problem which besets utility companies is the theft of energy achieved by meter tampering. One method for tampering with an electric meter is to reorient the socket causing it to run backwards, thus causing deregistration of energy usage. The meter is removed from its upright position in the socket and thereafter reinstalled in an inverted position. With the meter running in this inverted position the dials will run backwards, thus indicating a less than an accurate consumption of energy. The meter can then be reinverted prior to being read by an energy company representative with no indication of tampering.

Thus, there is a need to provide an indicator which can show whether a workpiece has been inverted.

Several types of tilt indicators have been developed to detect if tilting or inversion has occurred. These systems are generally mechanical in nature, often relying on gravity to move a particle or flag from a resting position when the device is reoriented. Many of these indicators require complicated or involved attachment to a target unit or activation procedures such as removing a strip or cutting a slit to provide access to the components of the device. For example, several devices use particles which, when the device is inverted, pass from a storage chamber to another chamber containing an adhesive-coated surface. The particles will adhere to the adhesive surface, thus providing an indication that the unit has been disturbed from its normal or upright position. Such devices may use a strip which separates the adhesive surface area from the particle storage chamber area, which strip must be removed prior to use. The process of activating the indicator may expose the particles and adhesive to the outside environment. If moisture were to enter the unit, the particles might clump and thus not flow freely. Alternatively, the adhesive may become deactivated, thus rendering the surface incapable of retaining the particles. In these circumstances, the indicator may fail to detect that the unit has been tilted or inverted. Accordingly, there is a need for an indicator which is unaffected by environmental conditions.

Some devices must be installed during the manufacturing or assembly process and thus cannot be retrofitted easily. It is an advantage for the indicator to be attachable to an existing workpiece, which would reduce the cost of installation and increase the adaptability of the indicator to different situations. Thus, there is a further need to provide an inversion indicator which not only can be installed to a workpiece during manufacture but also can be easily retrofitted to an existing workpiece.

Occasionally, an indicator will be triggered by incidental agitation without any angular tilting occurring. Accidental triggering produces a false reading of tilting when none has occurred, which can actually cost the user money and time where no damage has occurred, but where goods are returned or discarded as defective based solely upon the indicator alert. Thus, there is a need to provide an inversion indicator which is not triggered by agitation but is triggered only by actual inversion.

On the other hand, there are numerous circumstances in which it is highly desirable to detect agitation. Violent agitation, such as by dropping, is frequently a cause of hidden damage, particularly with electronic instruments. There is a need for an indicator which would reveal whether a container has been dropped from a height sufficient to cause damage to the goods but would not be triggered by being dropped only a short distance.

SUMMARY OF THE INVENTION

As will be seen, the present invention overcomes these and other problems associated with prior art inversion indicators. Stated generally, the present invention comprises an inversion indicator which is completely unaffected by environmental conditions, easy to manufacture, and simple to read. The indicator is readily adapted to a wide variety of applications and is easily installed, either during manufacturing or by retrofitting to an existing application. The indicator is resistant to accidental triggering from agitation which does not result in actual inversion, yet accurately registers even a momentary inversion of the device. The indicator will continue to indicate inversion after it has been triggered, and is not able to be deactivated.

Stated somewhat more precisely, the inversion indicator of the present invention comprises a pair of reservoirs which are normally discrete but which are placed in fluid communication with one another when the indicator is tilted beyond a predetermined angle. One of the reservoirs contains a fluid reactant, and the other reservoir contains a second reactant which will produce a detectable change when contacted by the first reactant. With the indicator in an upright position, the reactants are maintained within their separate reservoirs. However, when the indicator is tiled beyond a critical angle, the fluid reactant from the first reservoir enters the second reservoir and reacts with the second reactant. The detectable change in the reactants signals that the unit has been inverted.

Stated more specifically, a preferred embodiment of the present invention comprises a housing having a partition which divides the indicator into two reservoirs. The partition has an aperture therethrough located generally toward the bottom of the indicator. The aperture permits a fluid or semi-solid to pass when the indictor is tilted. The partition and the housing side walls define a receptacle which contains incidental amounts of fluid splashed through the aperture by accidental nontilting agitation and prevents such fluid from passing into the second reservoir. A container which is frangible from outside the housing, such as a glass ampule, is disposed within one reservoir and contains a first reactant, such as a dye. An absorbant such as cotton gauze is disposed within the other reservoir and contains a second reactant, such as a solution which will undergo a color change when contacted by the first reactant. After the unit is installed, the frangible container is broken outside the housing, releasing the dye into the first reservoir. Thereafter, if the unit is inverted, the dye will pass through the aperture in the partition and into the second reservoir, where it will contact the solution in the gauze. The solution reacts with the dye to produce a change which is visually detectable even after a subsequent reversion of the housing to its upright position.

In a first alternative embodiment an indicator as described above as the preferred embodiment is modified to provide an amount of absorbant in the upper portion of the fluid reservoir. The absorbant is impregnated with the second reactant. If the indicator is dropped onto a surface such that rapid deceleration occurs, the first reactant will splash up and react with the second reactant, producing a visible indication that the workpiece has been dropped.

In a second alternative embodiment an indicator is provided having a housing as described above, which contains a partition assembly. The partition divides the housing into a first and second reservoirs which contain a first and second reactants respectively. A pair of dividers create a receptacle between the first and second reservoirs. The reactants are each contained in a discrete ampule placed inside the appropriate reservoir. When activated the first and second reactants are discharged from the discrete ampules into the respective reservoirs. No absorbant is required in this embodiment. Either one or both of the reactants can be colored, so long as a detectable colored product is formed when the reactants are contacted. Alternatively, the reactants can both be colored and react to form a clear solution.

If the indicator is tilted to the right, the first reactant will pass through to the second reservoir and react with the second reactant, forming a visible product. Analogously, if the indicator is tilted to the left, the second reactant will pass into the first reservoir and form a visible product. Thus, the indicator is able to detect in which direction tilting has occurred.

In a third alternative embodiment an indicator is provided that is similar to the indicator of the second alternative embodiment except that the receptacle is divided into two receptacles by a divider positioned generally parallel and between the first and second dividers.

In this embodiment, if the indicator is tilted, but less than the critical angle, an amount of the first reactant can pass into the first receptacle. The presence of reactant in the receptacle provides an indication that the workpiece has been tiled in one direction. Analogously, if the indicator is tilted to the left, an amount of the second reactant will pass into the second receptacle, providing an indication of such tilting.

Thus, it is a principal object of the present invention to provide an indicator which will produce a visible signal if the unit to which it is attached has been tilted beyond a critical angle or inverted.

It is another object of the present invention to provide an inversion indicator which is self-contained and easily activated.

It is another object of the present invention to provide an inversion indicator which will prevent false indications when the unit has been agitated but not tilted beyond the critical angle.

It is still another object of the present invention to provide an indicator which is easily retrofitted to existing devices.

It is still another object of the present invention to provide an indicator which will continue to indicate inversion after it has been triggered.

It is another object of the present invention to provide an inversion indicator which is usable in a variety of circumstances.

It is another object of the present invention to provide an inversion indicator which is able to detect vertical or horizontal tilting.

It is another object of the present invention to provide an inversion indicator which is able to indicate dropping of the container to which it is mounted.

These objects, features and advantages of the present invention will be made clear by the following description and the accompanying drawings.

DETAILED DESCRIPTION OF THE PREFERRED EMBODIMENTS

Figure 1:
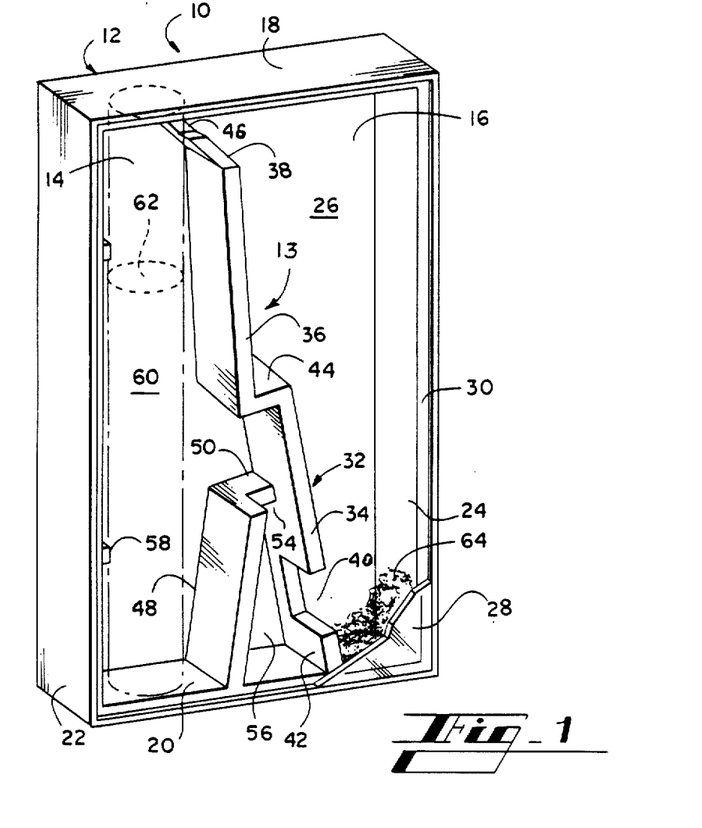
FIG. 1 is a perspective view of a preferred embodiment of the present invention.

Turning to the drawings, in which like numbers indicate like parts, FIG. 1 illustrates an inversion indicator 10 comprising a container 12 having a divider assembly 13 which separates first and second reservoirs 14 and 16. The container 12 is a generally rectangular box-shaped structure having a top wall 18, a bottom wall 20, a left side wall 22, a right side wall 24, a back 26 and a front 28 (shown cut away).

The indicator 10 is advantageously composed of a plastic material preferably having at least the front 28 being translucent to permit observation of the contents. The front 28 is preferably flexible to a certain degree to allow a user to depress the front toward the back 26.

Running along the front inside edge of the four container walls 18, 20, 22, and 24 is a recess 30 which receives the lateral edges of the front 28. The four container walls 18, 20, 22 and 24 and the back 26 can be molded together or attached as separate pieces to form a watertight seal. The front 28 is preferably manufactured as a separate piece to provide access to the reservoirs 14 and 16. The front 28 can be sonically or otherwise joined to the walls 18, 20, 22 and 24 to provide a watertight seal.

The divider assembly 13 includes a first partition 32 separating the first reservoir 14 and the second reservoir 16. The first partition 32 is composed of a set of connected panels 34, 36, and 38. The first panel 34 projects upward from the bottom wall 20 approximately midway toward the top wall 18. The first partition 32 contains an aperture 40 in its lower portion, the function of which will be described in greater detail below. The lower portion of the first panel 34 below the aperture 40 forms a splash protector 42. The upper end of the first panel 34 is connected to a first shoulder 44 extending generally horizontally with respect to the bottom wall 20. The second panel 36 extends from the first shoulder 44 toward the top wall 18. The third panel 38 is connected to the upper end of the second panel 36 and abuts the top wall 22. The third panel 38 is angled towards the left side wall 22. The third panel 38 has a first opening 46.

A second partition 48 extends upward from the bottom wall 20 on the side of the first partition 32 facing the first reservoir 14. The second partition 48 inclines toward the first partition 32 and ends in a second shoulder 50 which extends generally horizontally and abuts the first partition 32. The second shoulder 50 includes a second opening 54 therein. The bottom wall 20, first panel 34, second partition 48 and second shoulder 50 define a receptacle 56. A passageway is created between the first reservoir 14 and the second reservoir 16 via the first and second openings 46 and 54.

The first reservoir 14 is a fluid reservoir and contains a frangible fluid container, such as a glass ampule 60. The ampule 60 is designed to contain a first reactant 62 in such a manner that the first reactant 62 will not be discharged into the fluid reservoir 14 until the indicator 10 is activated. The ampule 60 is held away from the left side wall 22 by at least one and preferably a pair of spacer blocks 58 which extend from the left side wall 22. This spaced-apart relation facilitates breaking of the ampule 60 when the front 28 is depressed. The ampule fits within the container 12 with a minimal amount of clearance so that it does not impact upon the sides of the reservoir, thus preventing premature breakage and release of the first reactant 62.

The second reservoir 16 contains an absorbent material 64 (shown partially filling the second reservoir 16) such as a sponge, a matrix, open-celled or fibrous structure, a power or granular material, hollow permeable spheres, beads, or the like. The absorbant preferably substantially fills the second reservoir 16. The absorbant 64 is charged with a second reactant 66 (not shown), preferably such that the second reactant 66 does not leak or pass back through aperture 40 into the fluid reservoir 14. The absorbent contains essentially all the second reactant 66. In a preferred embodiment cotton gauze is used as the absorbent 64.

The first reactant 62 and second reactant 66 are any two substances which when contacted will produce a detectable change. Preferably, the reactants are substances which will produce a visible color change when contacted with each other. In a preferred embodiment of the present invention the first reactant 62 is a solution of sodium hydroxide, and the second reactant is a dye such as phenolphthalein. It is to be understood by those skilled in the art that any two appropriate reactants with a color changing reaction are useable. It is preferable that after reaction the color change be permanent so as to prevent any back reaction to the original state, which would produce a false negative indication. It is to be understood by one skilled in the art that the reactants can chemically react or physically combine to produce a detectable change. The latter can occur when two different colored reactants mix to form a third color.

In operation, the indicator 10 is mounted to a workpiece such as an electric meter or container by means of an adhesive attached to either the back 26 or one of the other exterior surfaces of the indicator 10. Preferably, the adhesive is non-removable to prevent tampering with the indicator itself. To activate the indicator 10 a user depresses the front 28 toward the back 26 with the ampule 60 therebetween. The pressure on the ampule 60 breaks the glass, releasing the first reactant 62 into the fluid reservoir 14. In the disclosed embodiment the indicator 10 is placed in a vertical orientation so that the first reactant 62 will fill the fluid reservoir 14 up to a level below the second shoulder 50. In this condition, the indicator 10 is activated. If the indicator 10 is tipped in a clockwise direction beyond a critical angle, the first reactant 62 will pass over the shoulder 50, through the opening 54 and into the receptacle 56. The first reactant 62 then passes through the aperture 40 and contacts the absorbant 64 containing the second reactant 66. A color change is thereby produced, giving an indication that the indicator 10 has been tipped.

The critical angle of tipping is determined by several factors. These factors include the height of the first reactant 62 fluid level in the fluid chamber 14 and how far from the second shoulder 50 the fluid level reaches. A second factor is the height and angle of inclination of the second partition 48 relative to the first partition 32.

In the disclosed embodiment of the present invention the critical angle is approximately 30° when the device is in a vertical orientation, i.e., with the top wall 18 above the bottom wall 20. Alternatively, the device can be positioned in a horizontal manner with the left side 22 below the right side 24. In this case the with the left side 22 below the right side 24. In this case the critical angle is approximately 120°, when tilted clockwise, or approximately 80° when tilted counterclockwise. It is to be understood that these critical angles are approximate and can be modified by changing the amount of the first reactant 62 in the fluid reservoir 16 or by modifying the dimensions and placement of the first partition 32 or second partition 48.

In order to prevent false positive reactions from occurring when the indicator 10 is agitated or otherwise disturbed but not tilted beyond the critical angle, the splash protector 42 prevents small amounts of the first reactant 62 which may accidentally pass through the opening 54 from passing through the aperture 40 into the absorbent reservoir 30. Should a small amount of first reactant 62 be discharged through the opening 54 into the receptacle 56, it will be retained therein and thus prevented from reacting with the second reactant 66.

In the case of violent agitation without any tilting, runoff of fluid dripping down from the second panel 36 will not fall through the second opening 54 because the second panel 36 overhangs the second shoulder 50 by an amount sufficient to prevent runoff of droplets from passing through the second opening.

If the indicator 10 is inverted and first reactant 62 passes through the passageway and into the absorbant reservoir 16, the amount of air displaced from the reservoir by the incoming first reactant 62 will pass through the first opening 46 in the third panel 38. This ensures that the first reactant 62 will not be prevented from contacting the second reactant 66 by a buildup of air pressure in the absorbant reservoir 16.

The indicator 10 can be used singly or in combination with several other indicators. For instance, if the workpiece is an electric meter, where inversion occurs about only one axis, one indicator 10 may be used in a horizontal orientation. In the case of a box or other container, which can be tilted about several different axes, several indicators 10 can be mounted to different sides or top of the container to provide an indication of which direction the container has been tilted. It may be important to known which about which axis tilting has occurred; several indicators 10 mounted about different axes provide an accurate way to detect such tilting.

The indicator 10 can be used in a horizontal orientation by placing it such that the left side wall 22 becomes the bottom. In this case, the critical angle of tipping is achieved when the fluid level in the fluid reservoir 14 passes over the second opening 54. The third panel 38 is angled toward the left side wall 22 so that when the indicator 10 is in the horizontal position the second opening 54 is higher with respect to the fluid level than the first opening 46. This ensures that if the indicator 10 is suddenly inverted, the first reactant 62 will flow through the second opening 54. If the first and second openings 46 and 54 were at the same level, there is the possibility that the openings could be covered by fluid simultaneously, with the air in the absorbant reservoir 16 not being able to escape into the fluid reservoir 14. In the disclosed embodiment, this angle is approximately 120°.

The present invention can also be used in a flat position with the back 26 below the front 28. In this situation the first reactant 62 will pass over the shoulder 50 when the indicator 10 is tilted more than approximately 14°.

For the purposes of the present invention a fluid will be understood to include any compound or composition which will flow from one location to another in response to gravity. Thus, a fluid would include a gelatin, power or granular material.

It is to be understood by those skilled in the art that while it is preferable to use two reactants to produce an intensely colored reaction product, a single reactant can be used. A colored fluid reactant 62 disposed in the fluid reservoir can pass into the absorbant reservoir 16 when the indicator 10 is tilted, staining the absorbant 64. Alternatively, the reactant 62 can be a substance which chemically reacts with the absorbant 64 when in contact to form a visible color change.

Figure 2:
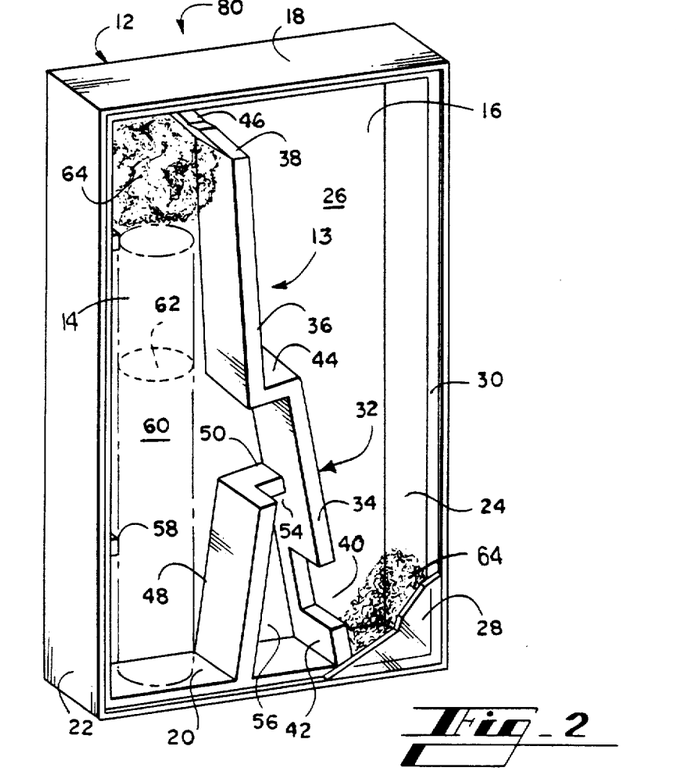
FIG. 2 is a perspective view of a first alternate embodiment of the present invention.

In a first alternative embodiment illustrated in FIG. 2, an indicator 80 is modified to include an amount of the absorbant and the second reactant retained in the upper portion of the fluid reservoir 14. When the unit is dropped onto a surface such that the rapid deceleration occurs the first reactant 62 will splash up and contact the second reactant 66 (not shown). This splashing will occur only with violent agitation by dropping. Mere gentle shaking will not cause the reactants to contact each other.

Figure 3:
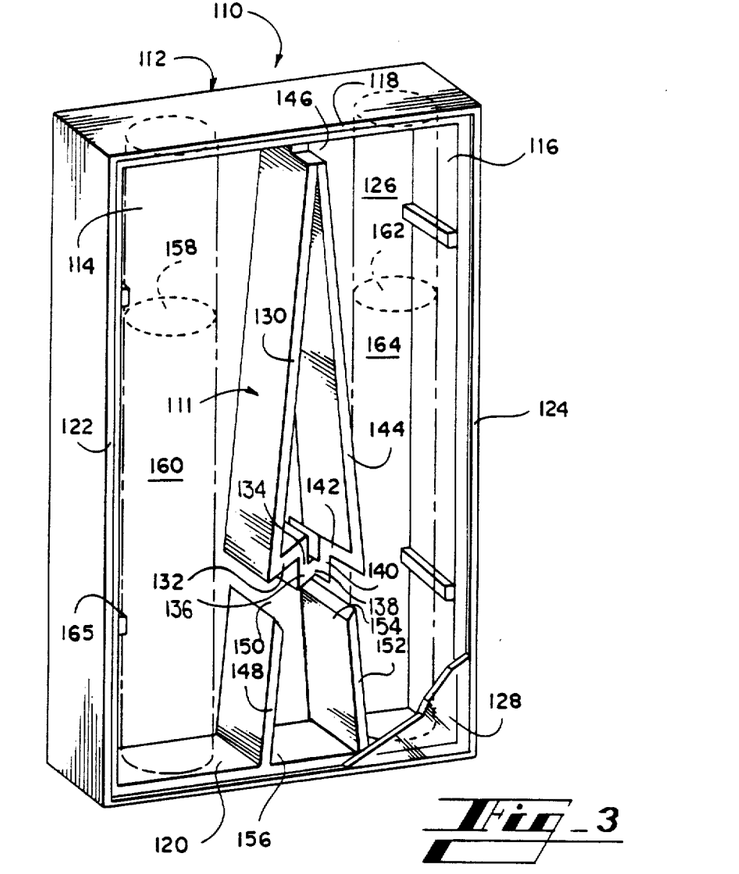
FIG. 3 is a perspective view of a second alternate embodiment of the present invention in which a pair of receptacles are utilized.

In a second alternative embodiment illustrated in FIG. 3, the present invention is adapted for use with two reactants without an absorbant. This embodiment provides an indicator 110 having a partition assembly 111 which separates a first and second reservoirs 114 and 116. The container 112 is formed of a top wall 118, bottom wall 120, left side wall 122, right side wall 124, back 126, and front 128.

The partition assembly 111 comprises a first panel 130 depending downward from the top wall 118 and angling slightly toward the left side wall 122. The first panel 130 abuts a first shoulder 132 which extends from the end of the first panel 130 toward the right side wall 124 and angles slightly upward. The first shoulder 132 abuts a second panel 134 which extends downward. The second panel 134 abuts a second shoulder 136 which extends toward the right side wall 124 and angles slightly upward. This second shoulder 136 terminates at a third shoulder 138 which extends toward the right side wall 124 and angles slightly downward. The third shoulder 138 abuts a third panel 140 which extends upward toward the top wall 118. The third panel 140 abuts a fourth shoulder 142 which extends toward the right side wall 124 and angles slightly downward. The fourth shoulder 142 connects to a fourth panel 144 which extends upward and terminates adjacent to the top wall 118 in proximity to the end of the first panel 130. The upper ends of the first and fourth panels 130 and 144 define an aperture 146 which places the first and second reservoirs 114 and 116 in fluid communication.

A first divider 148 extends upward from a point on the left portion of the bottom wall 120 toward the joint of the first panel 130 and the first shoulder 132, terminating in proximity thereto. The first shoulder 132 and the first divider 148 define a first opening 150.

A second divider 152 extends upward from a point on the right portion of the bottom wall 126 toward the joint of the fourth panel 144 and the fourth shoulder 142, terminating in proximity thereto. The fourth shoulder 142 and the second divider 152 define a second opening 154. The space between the bottom wall 120 and the first and second dividers 148 and 152 defines a receptacle 156. The first and fourth panels 130 and 144 overhang the first and second dividers 148 and 152 to encourage runoff of droplets formed by agitation of the reactants not to enter the receptacle 156.

A first reactant 158 is disposed within a first ampule 160, which is placed in the first reservoir 114. A second reactant 162 is disposed within a second ampule 164, which is placed in the second reservoir 116. Two sets of spacer blocks 165 serve the same purpose as the spacer blocks 58 described above with respect to the preferred embodiment.

In operation, the indicator 110 is mounted to a workpiece in a vertical orientation and activated by depressing the front 128 toward the back 126 with the first ampule 160 therebetween, thus breaking the ampule 160. This action is repeated with the second ampule 164. As a result, the first reactant 158 is released into the first reservoir 116 up to a level below the first opening 150. The second reactant 158 is released into the second reservoir 116 up to a level below the second opening 154. The reactants 158 and 162 will remain in their respective reservoirs so long as the indicator 110 is not tilted beyond a critical angle. In this embodiment, the critical angle is approximately 45°. If the indicator is tilted to the right more than about 30°, the first reactant 158 will pass through the first opening 150 and into the receptacle 156. This receptacle 156 is similar in purpose and function as the receptacle described above in the preferred embodiment, i.e., to prevent contact of the two reactants when the indicator is subjected to minor tilting or agitation.

When the indicator 110 is tilted to the right more than the critical angle, the first reactant 158 will pass from the first reservoir 114, through the first opening 150 and into the second reservoir 116. An amount of the first reactant 158 may pass into the receptacle 156. When the first and second reactants 158 and 162 contact each other a reaction occurs forming a colored product. The reactants can be fluids as previous described. Alternatively, the reactants can be different colors and will mix to form a third color.

Analogously, when the indicator 110 is tilted to the left more than about 30°, the second reactant 162 can enter the receptacle 156 through the second opening 152. When the indicator 110 is tilted to the left more than the critical angle, the second reactant 162 will contact the first reactant 158 in the first reservoir 114 and form a visible color change. The aperture 146 permits equalization of air pressure between the reservoirs in response to liquid passing between the first and second openings 150 and 154.

The indicator 110 produces a different result depending in which direction it is tilted and, therefore, a single indicator can be used to indicate if a container has been tilted, and, additionally, in which of two directions. The present embodiment can also detect if the indicator 110 has been completely inverted.

Figure 4:
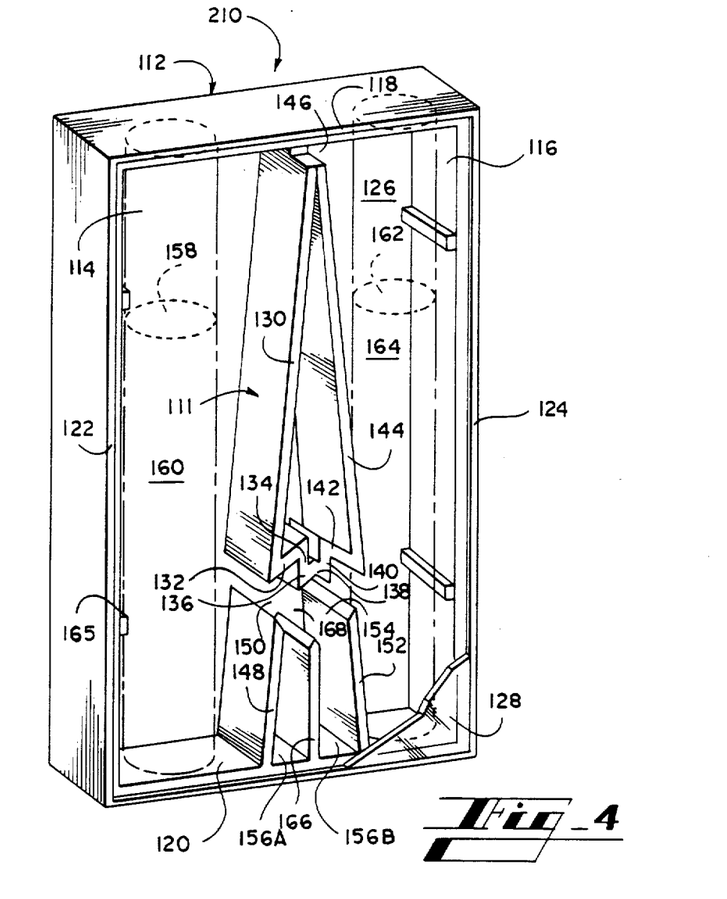
FIG. 4 is a perspective view of a third alternate embodiment of the present invention in which a pair of receptacles are utilized.

FIG. 4 illustrates a third alternative embodiment, in which an indicator 210 is provided that is similar to the second alternative embodiment except for a third divider 166 extending upward from the bottom wall 120 midways between the first and second dividers 148 and 152 and terminating below the joint of the second and third shoulders 136 and 138, thereby defining third opening 168. The third divider 166 separates the receptacle into a first and second receptacles 156A and 156B. The first, second and third openings 150, 154 and 168 form a passageway which places the first and second reservoirs 114 and 116 in fluid communication.

The first and second receptacles 156A and 156B function in a similar manner as the receptacle 156. The third divider 166 is designed such that the indicator 110 is tilted from the vertical in either rotation, less than the critical angle, the first reactant 158 will not pass from the first reservoir 114 into the second receptacle 156B nor will the second reactant 162 pass from the second reservoir 116 into the first receptacle 156A. Presence of the first reactant 158 in the first receptacle 156A or presence of second reactant 162 is the second receptacle 156B provides an indication that the indicator 110 has been tilted, but less than the critical angle.

While the invention has been described in connection with certain preferred embodiments, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. An inversion indicator comprising:
a container having front and back walls, left, right, upper and lower side walls;
a partition disposed within said container to define a first reservoir and a second reservoir, said partition defining an aperture therein such that said first and second reservoirs are placed in fluid communication when said indicator is tilted beyond a critical angle;
a first reactant disposed within said first reservoir;
a second reactant disposed within said second reservoir and operative to react with said first reactant to produce a visually detectable reaction, whereby when said indicator is tilted beyond a critical angle, said first reactant will contact said second reactant and react with said second reactant to produce a detectable change; and
a receptable disposed within said container beneath said aperture in said partition which will retain an amount of said first reactant less than the amount of reactant which will be transferred through said aperture when said indicator is tilted beyond said critical angle, said receptacle being disposed such that incidental amounts of said first reactant which are accidentally discharged from said first reservoir by agitation of said container are contained within said receptacle and prevented from contacting said second reactant until said indicator is tilted beyond said critical angle.

2. The inversion indicator of claim 1, wherein said partition comprises:
a first panel extending between said upper and lower container walls, said aperture in said partition comprising an aperture in the lower portion of said first panel; and
a second panel projecting upward from said lower container wall and terminating adjacent said first panel so as to define an opening therebetween, said lower portion of said first panel, said second panel, and said lower container wall defining said receptacle.

3. The inversion indicator of claim 2, wherein said aperture comprises a first aperture, and wherein said first panel further defines a second aperture in its upper portion such that said first reservoir is placed in fluid communication with said second reservoir, whereby air displaced from one reservoir by the passage of fluid into said reservoir can pass to the other reservoir.

4. The inversion indicator of claim 1, wherein said front wall is depressible and further comprising a frangible vessel disposed within said first reservoir for containing said first reactant until it is desired to activate said indicator.

5. The inversion indicator of claim 4, wherein said vessel is openable from outside said container when said vessel is disposed within said container so as to discharge said first reactant into said first reservoir.

6. The inversion indicator of claim 1, wherein said first and second reactants comprise two substances which when contacted with each other will produce a visible color change.

7. The inversion indicator of claim 1, wherein one of said reactants is a dye.

8. The inversion indicator of claim 1, wherein one of said reactants is phenolphthalein.

9. The inversion indicator of claim 1, wherein one of said reactants is sodium hydroxide.

10. The inversion indicator of claim 6, wherein said first reactant is sodium hydroxide and said second reactant is phenolphthalein.

11. The inversion indicator of claim 2, further comprising an absorbant disposed within said second reservoir for containing said second reactant.

12. The inversion indicator of claim 11, wherein said absorbant is composed of a fibrous material.

13. The inversion indicator of claim 11, further comprising an amount of absorbant disposed within the upper portion of said first reservoir said absorbant containing an amount of said second reactant, whereby dropping of said indicator will cause said first reactant to splash up and contact said absorbant in the upper portion of said first reservoir to form a visible color change.

14. The inversion indicator of claim 1, wherein said receptacle comprises a pair of receptacles separated by a divider, whereby said inversion indicator will indicate a tipping thereof to an angle less than said critical angle.

15. The inversion indicator of claim 4, wherein said frangible vessel comprises a first frangible vessel, and wherein said inversion indicator further comprises a second frangible vessel disposed within said second reservoir for containing said second reactant until it is desired to activate said indicator, said second vessel being openable from outside said container when said second vessel is disposed within said container so as to discharge said second reactant into said second reservoir.

16. An inversion indicator comprising:
  a rectangular container having a depressible front wall, upper and lower walls, a rear wall, left and right side walls;
  a first partition comprising:
    a first panel projecting upward from said lower container wall toward said upper container wall and said first panel defining an aperture therein; and
    a second panel extending upward from said first panel toward said upper wall, said second panel defining a first opening;
  said first partition being disposed within said container to define a first reservoir and a second reservoir, said aperture providing fluid communication between said first and second reservoirs when said indicator is tilted beyond a critical angle;
  a second partition comprising a third panel projecting upward from said lower container wall and terminating adjacent said first panel so as to define a second opening therebetween;
  a first reactant disposed within a frangible vessel residing within said first reservoir for containing said first reactant until it is desired to activate said indicator; and
  a second reactant disposed within an absorbant placed within said second reservoir and operative to combine with said first reactant to produce a visually detectable change,
  whereby when said indicator is tilted beyond a critical angle or dropped, said first reactant will contact said second reactant and combine with said second reactant to produce a visually detectable change.

* * * * *